United States Patent
Hopmeier et al.

(10) Patent No.: US 6,599,127 B1
(45) Date of Patent: Jul. 29, 2003

(54) SYSTEM AND METHOD FOR SIMULATED DEVICE TRAINING

(75) Inventors: Michael J. Hopmeier, Mary Esther, FL (US); John C. Taffe, Houston, TX (US)

(73) Assignee: Explotrain, LLC, Eglin AFB, FL (US)

( * ) Notice: Subject to any disclaimer, the term of this patent is extended or adjusted under 35 U.S.C. 154(b) by 0 days.

(21) Appl. No.: 09/481,682

(22) Filed: Jan. 12, 2000

Related U.S. Application Data
(60) Provisional application No. 60/115,912, filed on Jan. 14, 1999.

(51) Int. Cl.$^7$ ................................................ G09B 11/00
(52) U.S. Cl. ..................................... 434/16; 434/307 R
(58) Field of Search .................... 434/11, 366; 102/498

(56) References Cited

U.S. PATENT DOCUMENTS

| | | | |
|---|---|---|---|
| 4,014,111 A | | 3/1977 | Miller |
| 4,091,550 A | | 5/1978 | Schrenk et al. |
| 4,114,080 A | | 9/1978 | Greenwood |
| 4,132,312 A | | 1/1979 | Kamada |
| 4,432,731 A | | 2/1984 | Batchie |
| 5,114,140 A | | 5/1992 | Barr |
| 5,207,579 A | * | 5/1993 | Campagnuolo ............... 434/11 |
| 5,246,372 A | * | 9/1993 | Campagnuolo et al. ........ 434/11 |
| 5,351,623 A | | 10/1994 | Kissel et al. |
| 5,359,936 A | | 11/1994 | Simpson et al. |
| H1390 H | * | 1/1995 | Campagnuolo et al. ........ 434/11 |
| 5,511,978 A | | 4/1996 | Sellers, Jr. et al. |
| 5,648,636 A | | 7/1997 | Simpson et al. |
| 5,679,003 A | * | 10/1997 | Schwechel ................... 434/219 |
| 5,944,502 A | | 8/1999 | Denchfield |
| 5,947,742 A | * | 9/1999 | Katayama .................... 434/247 |
| 5,954,507 A | * | 9/1999 | Rod et al. ...................... 434/19 |
| 5,958,299 A | * | 9/1999 | Kury et al. ................ 252/408.1 |
| 6,065,404 A | * | 5/2000 | Ripingill, Jr. et al. ...... 102/498 |
| 6,193,519 B1 | * | 2/2001 | Eggert et al. ................ 434/262 |

FOREIGN PATENT DOCUMENTS

| | | | |
|---|---|---|---|
| FR | 2726677 | | 5/1996 |
| JP | 04155197 A | * | 5/1992 |

* cited by examiner

*Primary Examiner*—Joe H. Cheng
*Assistant Examiner*—Kathleen M Christman
(74) *Attorney, Agent, or Firm*—Morrison & Foerster LLP

(57) ABSTRACT

A system and method for simulated device training is disclosed. According to one embodiment of the present invention, the system includes a simulated device having at least one sensor. A controller is provided, and interfaces with the at least one sensor and with a feedback device. In another embodiment, the method includes the steps of (1) providing a simulated device having at least one sensor; (2) monitoring the simulated device for the presence of a stimulus; and (3) providing feedback in response to a predetermined stimulus.

57 Claims, 5 Drawing Sheets

SYSTEM AND METHOD FOR SIMULATED DEVICE TRAINING

This application incorporates by reference, in its entirety, U.S. Provisional Patent Application No. 60/115,912, filed Jan. 14, 1999.

BACKGROUND OF THE INVENTION

1. Field of the Invention

The invention relates generally to a simulator device for training. In particular, the present invention is directed to a system and method for training in operations on explosive devices.

2. Description of the Related Art

Explosive devices, including land mines, bombs, missiles, weapons of mass destruction (WMD) and terrorist-type explosives (Improvised Explosive Device, or IED), are a source of casualties, both in military action and in peacetime. For example, about 26,000 people are killed or maimed worldwide each year by antipersonnel (AP) land mines. Land mines were responsible for 34% of US casualties during the Persian Gulf War; 33% of US casualties in Vietnam; 284 casualties in the UN peacekeeping and NATO operation in Bosnia; and the first US soldiers to die in Bosnia and Vietnam were killed by AP mines. An additional ten million mines are employed annually.

Despite the ever-increasing threat, there is a greater pressure to reduce the number of injuries resulting from explosive devices. To that end, people, including soldiers, need to be trained on disarming explosive devices without placing the trainee in danger. Classroom training, however, does not present a trainee with the same conditions and stresses that are encountered when disarming an explosive device in the field.

SUMMARY OF THE INVENTION

Therefore, a need has arisen for a training system that is inexpensive, reliable, and able to simulate explosive devices and the environment and situations in which they are worked.

According to one embodiment of the present invention, a system for simulated device training is disclosed. The system includes a device having at least one sensor. A controller is provided, and interfaces with at least one sensor and with a feedback device.

In another embodiment, a method for simulated device training is provided. The method includes the steps of (1) providing a simulated device having at least one sensor; (2) monitoring the simulated device for the presence of a stimulus; and (3) providing feedback in response to a predetermined stimulus.

According to one embodiment of the present invention, the simulated device may simulate, inter alia, a munition, an intrusion alert system, or a locking device. The sensors may measures a stimulus, for example, light, sound, vibration, variations in local magnetic fields, pressure, temperature, and combinations thereof. The feedback device may be a cannon, a flashing light, a horn, a buzzer, a vibrating device, a computer display, or some other device or method of either presenting information and/or storing it for future review and analysis after recall.

A technical advantage of the present invention is that the system and method of the present invention are safer than current systems available. Another technical advantage is that, in some embodiments, because no actual high or low explosive material is needed, none of the logistics, security or environmental impact associated with current systems apply. Another technical advantage of the present invention is that it may provide continuous, instantaneous feedback on the trainee's performance. Another technical advantage of the present invention is that may be fully configurable to any scenario. Still another technical advantage of the present invention is that it has the capability to maintain an exact record of performance and progress through training. Another technical advantage of the present invention is that it may provide field training with minimal cost or support. Another technical advantage of the present invention is that it may be adaptable to a wide array of new technologies, munitions, and explosive devices, which allows it to not only be used with existing ordnance, but with future ordnance as well. Still another technical advantage of the present invention is that may allow for self-paced, around-the-clock, all-weather exercises, both indoor and outdoor. Another technical advantage of the present invention is that it may provide for individual training with emphasis on deficient skills. Still another technical advantage of the present invention is that it may be stand-alone, providing indigenous training capability. Another technical advantage of the present invention is that may provide greater standardization in training by the reduction of subjective elements from evaluation.

BRIEF DESCRIPTION OF THE DRAWINGS

For a more complete explanation of the present invention and the technical advantages thereof, reference is now made to the following description and the accompanying drawings, wherein like reference numerals represent like parts, in which.

DESCRIPTION OF THE PREFERRED EMBODIMENT

Embodiments of the present invention and their technical advantages may be better understood by referring to FIGS. 1 through 5, like numerals referring to like and corresponding parts of the various drawings.

Figure 1:
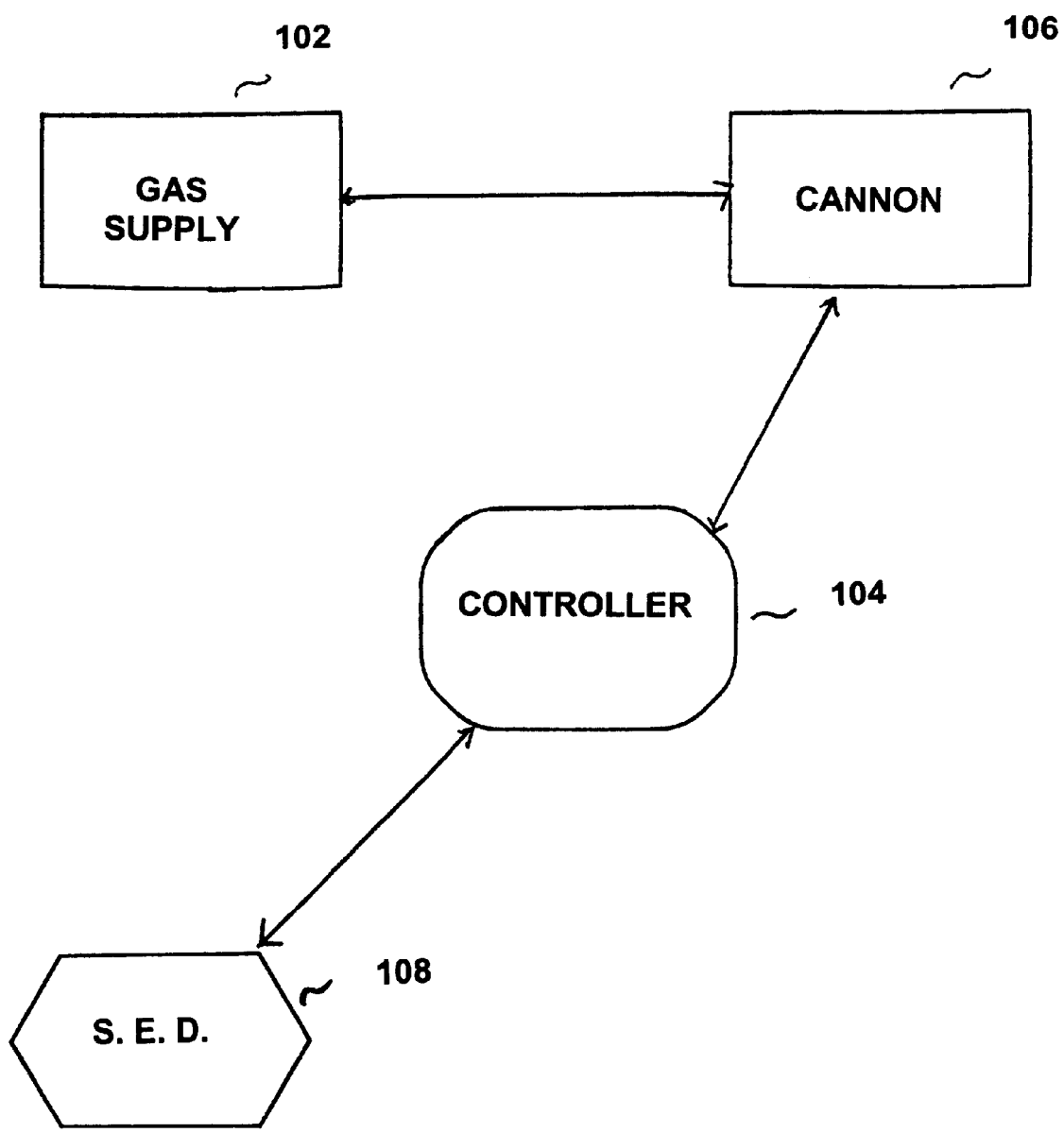
FIG. 1 illustrates a block diagram of the system for simulated device training according to one embodiment of the present invention.

Referring to FIG. 1, which depicts a general block diagram of training system 100 according to one embodiment of the present invention, training system 100 generally includes the following elements: gas supply 102 (oxygen and propane, or other suitable gases that can create a combustible mixture), controller 104, cannon 106, and simulated device 108. Gas supply 102 supplies a regulated amount of gas on demand to cannon 106 so that it may ignite or detonate. Cannon 106 is a properly-shaped tube that is open on one end, and modified so that gas from cylinders 102 may flow into the base, or closed end, and then be ignited by a spark. The ignition of the gases produces a loud report to simulate an explosion.

In one embodiment, gas supply 102 comprises two gas cylinders. One of the cylinders supplies fuel to cannon 106, while the other one supplies oxygen. These gasses are supplied at the proper pressures through hoses to cannon 106.

In another embodiment, any device that provides immediate feedback for a trainee, such as flashing lights, horns, buzzers, computer displays, electronic voice, etc., may be provided in lieu of gas supply 102 and cannon 106. It may be impractical to provide audible feedback to a trainee (due to light/sound discipline observed during field time). Therefore, in another embodiment, controller 104 may be configured to send a signal to a vibrating pager-like device, worn by a trainee, in order to provide the requisite feedback. This may be performed via hard wire, or wirelessly. Other methods of devices for relaying, presenting, or storing information may also be used.

Controller 104 controls training system 100. In one embodiment, controller 104 permits training system 100 to be armed and disarmed remotely, and fires cannon 106 upon receipt of a firing signal. In another embodiment, controller 104 may perform additional controlling features.

Controller 104 may be a computer, such as a personal computer or a mainframe computer. In one embodiment, a notebook computer, based on a Pentium™-series processor, manufactured by Intel, Inc., of Schaumburg, Ill., serves for controller 104 because of its portability and size. Other processors, including digital signal processors, and types of computers may also be used.

In another embodiment, controller 104 may be a simple process control device that converts a firing signal (from simulated device 108) into an action of initiating the signaling of firing. It may consist of a simple receiver (RF, hardwire, other) that closes a switch upon receipt of a firing command. In one embodiment, controller 104 may be housed within simulated device 108.

Simulated device 108 may simulate any munition or explosive device, from 20 mm ordnance to much larger ordnance, such as the GBU-28 (a 4,700 pound laser-guided bomb). This includes mines, car bombs, IEDs, WMDs, mortars, grenades, etc. Underwater ordnance or devices may also be simulated.

In another embodiment, simulated device 108 may simulate an intrusion alert device, such as a burglar alarm or a booby trap. In this embodiment, at least one sensor may be emplaced in the intrusion alert device. During training, if a trainee fails to properly disarm the intrusion alert device, or simply bypasses the device, the feedback mechanisms disclosed herein may be triggered. A number of intrusion alert devices are within the contemplation of the present invention, including vehicle alarms, home alarms, motion detectors, and other devices.

In another embodiment, simulated device 108 may simulate a variety of locking devices, such as lock and tumbler locks on buildings, combination locks, locks on safes, keypads, sensor pads, etc.

Simulated device 108 houses at least one transmitter (not shown) for transmitting a firing signal to controller 104. The transmitter may communicate with any of a variety of transducers, or sensors, that allow simulated device 108 to be "triggered" when a certain threshold of interference, or disturbance, is reached. Examples of suitable sensors include sensors to measure or sense the presence of light, movement, sound, vibration, variations in local magnetic fields, pressure, temperature, or other measurable parameters.

For example, the transmitter could be wired to an accelerometer, which would close a circuit and generate and transmit a firing signal if simulated device 108 were suddenly moved, or bumped, or received some other stimulus. Timing devices may also be used in coordination with the transmitter to send the initiation signal in the event that sufficient time has passed after some disturbance, or initiation of the exercise/event.

Figure 2:
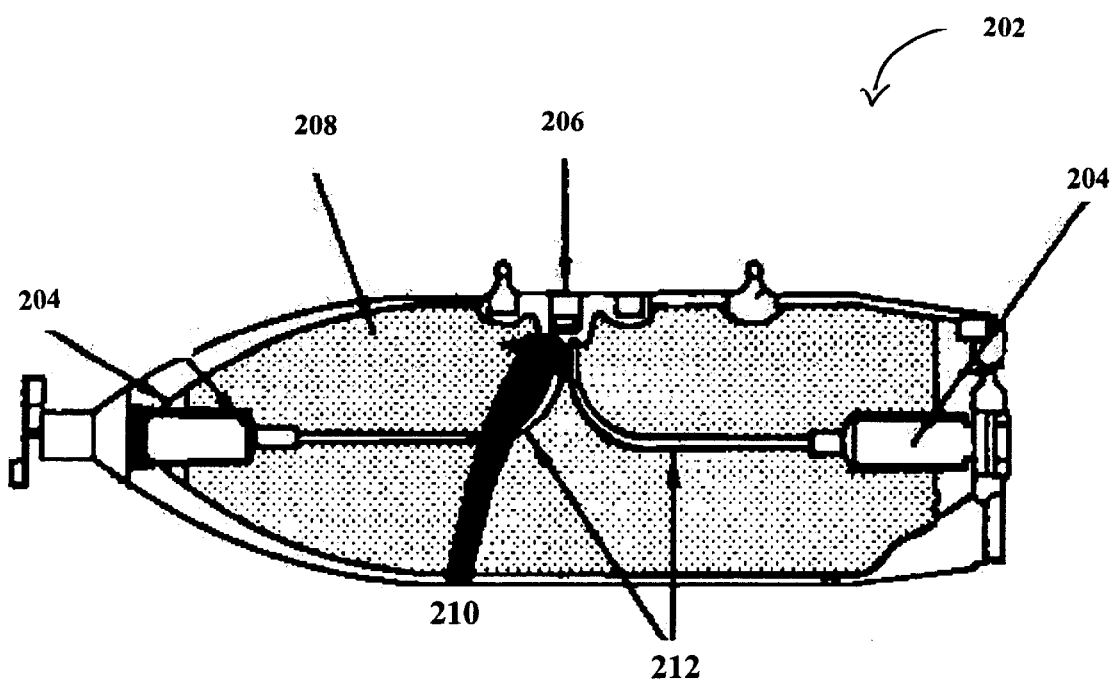
FIG. 2 illustrates an example of a simulated device with sensors according to one embodiment of the present invention.

Referring to FIG. 2, an example of simulated device 108 is provided. In this figure, and by way of example only, simulated device 108 simulates a general purpose bomb; however, as discussed above, any type of device may be simulated. As shown in the figure, general purpose bomb 202 includes simulated explosive filler 208. General purpose bomb 202 also includes a sensor array, consisting of at least one sensor 204. Sensors 204 may be uniquely configured for use with a particular simulated device, or it may be a universal sensor array, which can be used with a variety of simulated devices. Sensors 204 may be used to sense a parameter (IR, RF, magnetic influence, impact, acoustic, proximity, etc.) alone or in combination, that may detonate the device. As depicted in the figure, simulated device 108 has a nose fuse sensor 204 near at the nose of general purpose bomb 202, and a tail fuse sensor 204 near the tail of general purpose bomb 202. In one embodiment, nose fuse sensor 204 may be an impact of proximity activated sensor, while tail fuse sensor 204 may be a time delay, anti-disturbance, or magnetic sensor.

Sensors 204 may be connected to transmission port 210 via internal connection 212, and provide output signal 206 for controller 104. Output signal 206 may be a RF signal, an IR signal, or may be sent via hard wire, fiber optic, or other hardware.

The thresholds for sensors 204 that must be met in order to transmit a firing signal may be configured by controller 104, so that no hardware modifications are required to alter the scenario that a trainee is presented with. In another embodiment, sensors 204 may have an on-board adjustment device, such as a potentiometer, for adjusting the sensitivity of sensors 204. In another embodiment, the threshold of sensors 204 may be fixed in their response, and not be adjustable.

Sensors 204 are readily available and are inexpensive. In one embodiment, sensors 204 are mercury trembler switches available from Radio Shack. Depending on the particular sensor used, there is no or little maintenance required. Sensors 204 may require on-board battery power, such as a 9 volt battery.

Referring again to FIG. 1, controller 104 may be configured to provide an indicator light and/or buzzer that indicate the reception of a firing signal, in addition to, or instead of, actually firing cannon 106. This configuration allows training system 100 to be used to detect improper handling of simulated device 108 without actually firing the cannon. Controller 104 may also provide information as to status/health of system (armed/disarmed, powered on or turned off, amount of fuel or battery power remaining, etc.).

Controller 104 may communicate with gas supply 102 and simulated device 108 by wires, such a twisted pair, multi-line, fiber optic, or any other suitable wires, or the communication may be wireless, such as a broadcast communication, including IR, RF, or other suitable form of broadcast communication.

Controller 104 may process software that is used to control the simulation. In addition, a database may be provided for controller 104. The database may be used to store different scenarios for trainees, as well as to store trainee information, such as past performances, past simulations run, or any other relevant information.

The operator, or the trainer, may configure sensors 204 to present the trainee with a particular scenario. In one embodiment, the software controls the thresholds of sensors 204 to allow real-time configuration of the exercise. This may be based on the past performance of the trainee, as well as the difficulty of the problem. The particular problems a trainee will encounter may be pre-set scenarios in the software, or may be changed by the trainer during training.

In another configuration, the controller 104 may simply respond to a hardwired, semi-permanent command setting built into the switch that detects the movement, etc. of the device with no ability to support variability of the system.

Controller 104 may have the ability to control multiple simulated devices 108 at the same time, allowing one trainer to monitor several trainees simultaneously. Controller 104 may analyze the trainee's performance objectively, yielding a continuous, analytic record of performance.

Controller 104 may also use multi-media. A digital camera (not shown) may be used to record a video of the trainee's performance and to record and to store this performance. This may allow the subsequent observation by the trainee of his or her performance. In one embodiment, the video may be coupled with a display of sensor data, so that a trainee can see the effect of each particular action on the sensors. This may allow the trainee to see the immediate effect of each individual act, and the hazards or danger that it created.

Figure 3:
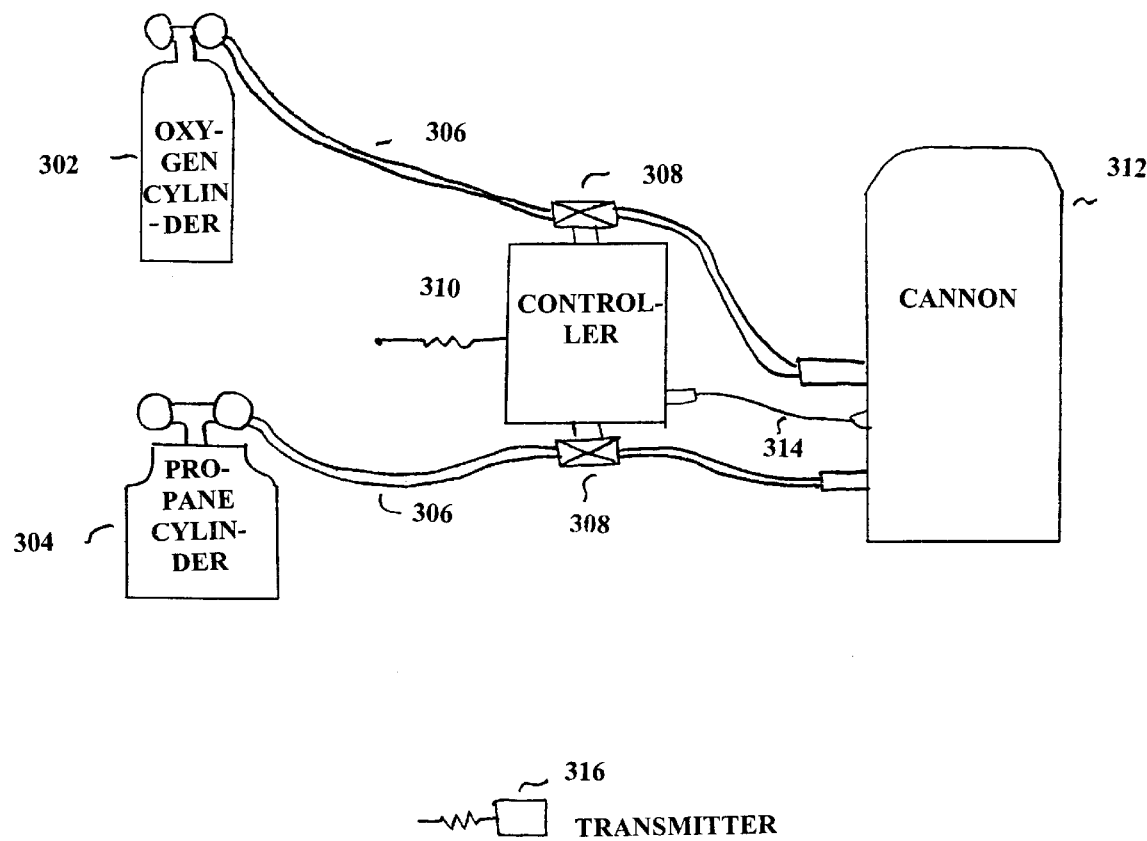
FIG. 3 illustrates a schematic of the system for simulated device training according to one embodiment of the present invention.

An example configuration of a training system according to one embodiment of the present invention is provided. Referring to FIG. 3, oxygen cylinder 302 and propane cylinder 304 supply gas at regulated pressures through hoses 306 to solenoid valves 308. Solenoid valves 308 are controlled by controller 310, which not only regulates gas flow to cannon 312, but also controls the firing of cannon 312 after it is filled with gas by igniting the gas mixture with sparking device 314. The gas fill and fire sequence of the controller 310 is initiated upon reception of a signal from transmitter 316. Transmitter 316 may be triggered by a transducer (not shown), which initiates a signal when a certain threshold of interference or disturbance of the simulated device is reached.

Figure 4:
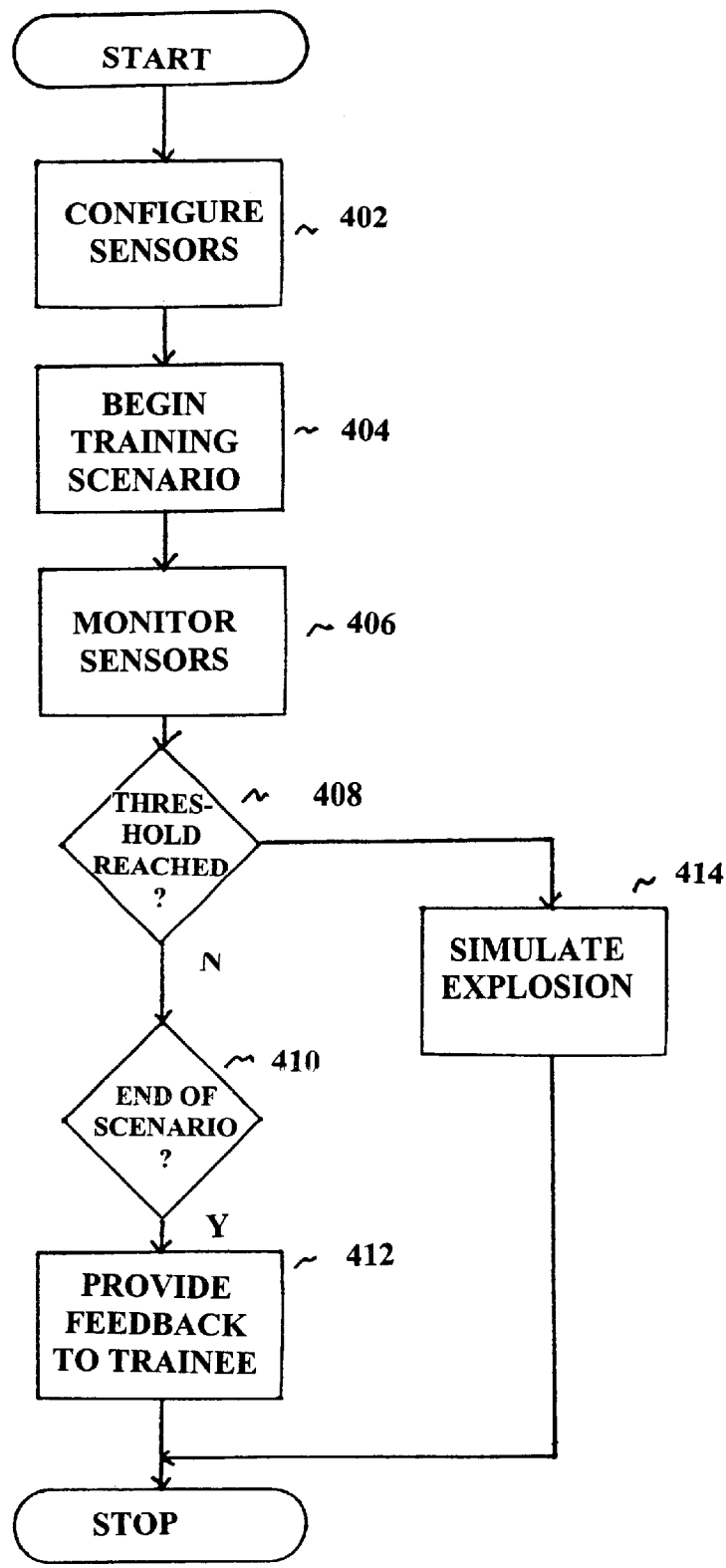
FIG. 4 illustrates a flowchart of the method for simulated device training according to one embodiment of the present invention.

According to another embodiment of the present invention, a method for simulated device training is provided. Referring to FIG. 4, a flowchart depicting a preferred method is illustrated.

In step 402, the trainer configures the sensors in the simulated device for the training scenario. This may be done by selecting from a standard training scenario in the controller's database, or it may be accomplished by configuring each sensor individually. In one embodiment, the trainer may reconfigure the sensors during the training scenario to change the difficulty level for the trainee.

Next, in step 404, the trainee begins the training scenario. Concurrently, digital cameras or other recording devices may be initiated, to record the trainee's performance.

In step 406, the controller monitors signals from the sensors in the simulated device. If, in step 408, a sensor's threshold is reached, in step 414, the controller sends a firing signal to the cannon, which provides a report for the trainee.

In step 410, the training continues until the scenario is complete. Once complete, the cannon may be disarmed to avoid unintentional firing.

In step 412, the trainee may be provided with feedback, in the form of an after-action review, from the trainer. If video were recorded, this may be presented to the trainee. In another embodiment, "meters" representing the level of activity that a sensor sensed may be provided for the trainee.

Other training scenarios are contemplated in this invention. Although the method, describe above, was discussed in conjunction with a cannon, other feedback mechanisms, such as buzzers, flashing lights, vibrating pager-like devices, etc., or some a suitable method or device for relaying, presenting, and/or storing information may also be used.

The system and method of the present invention very closely simulates the results of initiation of explosive devices without the attending hazards of using actual live explosives. By careful configuration of the sensors used to provide the firing signal, the relative sensitivity of simulated device used in training can be modified to match the trainee's skill or confidence level. The threat of the loud report of the cannon closely approximates the pressure of working on actual explosive devices serving to provide as realistic training scenario as possible.

Figure 5:
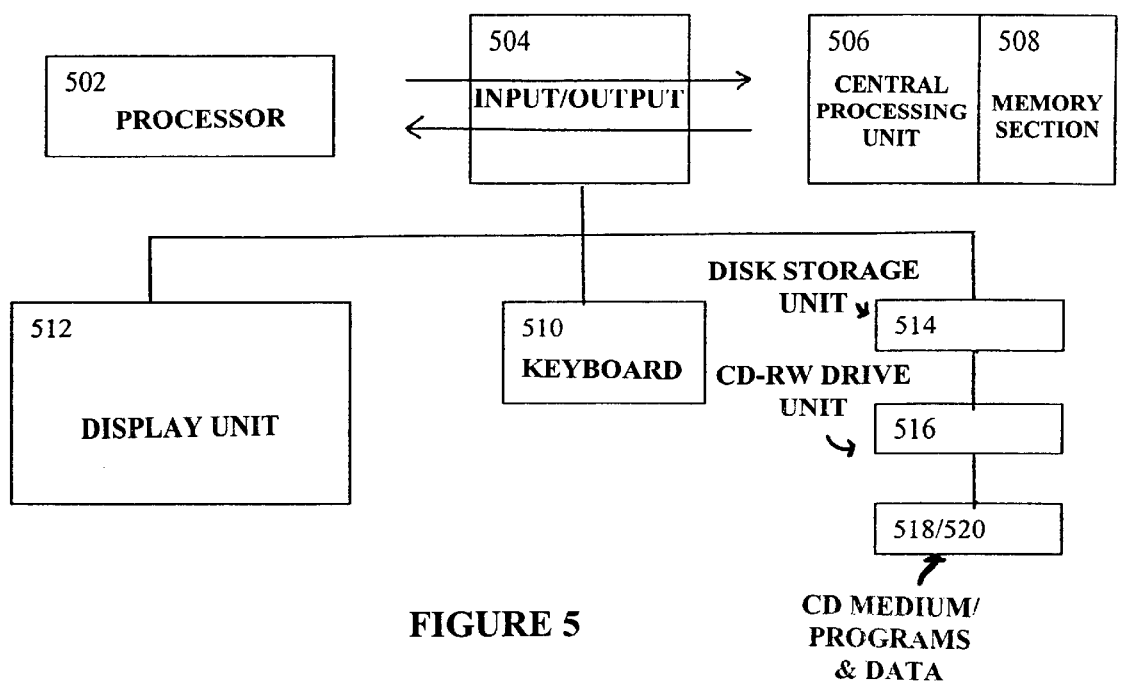
FIG. 5 depicts a general purpose computer system for use in conjunction with one embodiment of the present invention.

Referring to FIG. 5, a block diagram of a general purpose computer system for use in conjunction with one embodiment of the present invention is provided. General purpose computer system includes processor 502 has input/output section 504, central processing unit 506, and memory section 508. Input/output section 504 may be connected to keyboard 510, display unit 512, disk storage unit 514, and CD-RW drive unit 516. CD-RW unit 516 can read and write to a CD medium 518, which typically contains programs and data 520. In one embodiment, the general purpose computer may lack some or all of the features described above. For example, the general purpose computer may operate as a terminal, an emulator, etc. with network access. Other input/output devices may be provided, including an interface for receiving a signal from the simulated training device, a digital camera, etc., may be provided.

While the invention has been described in connection with preferred embodiments and examples, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification is considered as exemplary only, with the true scope and spirit of the invention being indicated by the following claims.

What is claimed is:

1. A system for simulated device training, comprising:
   a simulated explosive device;
   at least one sensor connected to said simulated explosive device, the sensor outputting a signal corresponding to a measurable parameter sensed by the sensor;
   a controller interfacing with said sensor;
   a feedback device interfacing with said controller;
   wherein the feedback device is actuated in response to the signal achieving a predetermined threshold; and
   further comprising a display for displaying a representation of said signal, wherein the representation of said signal is displayed in real time.

2. The system of claim 1, wherein the simulated explosive device is a munition.

3. The system of claim 1, wherein the at least one sensor is a mercury trembler switch.

4. The system of claim 1, wherein the at least one sensor measures at least one of the following: light, sound, movement, vibrations, variation in local magnetic fields, pressure and temperature.

5. The system of claim 1, wherein the a feedback device is selected from the group consisting of a flashing light, a horn, a buzzer, a computer display, and a vibrating device.

6. The system of claim 1, wherein the feedback device comprises:
   a gas supply;
   a cannon; and
   a sparking device for igniting fuel from the gas supply.

7. The system of claim 1, further comprising:
   a recording device for recording a trainee's performance.

8. The system of claim 1, wherein the at least one sensor, the controller, and the feedback device communicate by a communication means selected from the group consisting of infrared (IR), radio frequency (RF), hardwire, and acoustics data coupling.

9. The system of claim 1, wherein the at least one sensor has an adjustable threshold.

10. The system of claim 9, wherein the threshold of the at least one sensor is adjusted by the controller.

11. The system of claim 1, wherein the controller is a computer.

12. The system of claim 1, wherein the signal from the sensor is a substantially continuous waveform.

13. A method for simulated device training, comprising:
providing a simulated explosive device having at least one sensor, the sensor producing a signal corresponding to a measurable parameter sensed by the sensor;
receiving the signal from the at least one sensor;
providing feedback in response to the signal reaching a predetermined level; and
displaying a representation of said signal, wherein the representation of said signal is displayed in real time.

14. The method of claim 13, wherein the simulated explosive device is a munition.

15. The method of claim 13, wherein the at least one sensor is a mercury trembler switch.

16. The method of claim 13, wherein the at least one sensor measures at least one of the following: light, sound, movement, vibrations, variation in local magnetic fields, pressure, and temperature.

17. The method of claim 13, wherein the a feedback device is selected from the group consisting of a flashing light, a horn, a buzzer, a computer display, and a vibrating device.

18. The method of claim 13, wherein the feedback device comprises:
a gas supply;
a cannon; and
a sparking device for igniting fuel from the gas supply.

19. The method of claims 13, further comprising the step of:
recording a trainee's performance.

20. The method of claim 13, wherein the at least one sensor, the controller, and the feedback device communicate by a communication means selected from the group consisting of infrared (IR), radio frequency (RF), hardwire, and acoustics data coupling.

21. The method of claim 13, wherein the at least one sensor has an adjustable threshold.

22. The method of claim 21, wherein the threshold of the at least one sensor is adjusted by the controller.

23. The method of claim 13, wherein the controller is a computer.

24. The method of claim 13, wherein the step of providing a signal corresponding to a measurable parameter sensed by the comprises:
providing a substantially continuous signal corresponding to the measurable parameter sensed by the sensor.

25. A simulated explosive device, comprising:
a body;
at least one sensor in said body; the sensor outputting a signal corresponding to a measurable parameter sensed by the sensor;
a transmitter connected to the at east one sensor, the transmitter transmitting the signal to a remote location; and
further comprising a display for displaying a representation of said signal, wherein the representation of said signal is displayed in real time.

26. The simulated explosive device of claim 25, wherein the at least one sensor comprises a sensor array.

27. The simulated explosive device of claim 25, wherein the sensor senses at least one of the following: IR, RF, magnetic influence, impact, acoustic, proximity, acceleration, temperature.

28. The simulated explosive device of claim 25, wherein a threshold of at least one sensor is adjustable.

29. The simulated explosive device of claim 25, wherein the at least one sensor may be remotely controlled.

30. The simulated explosive device of claim 25, wherein the at least one sensor comprises a mercury trembler switch.

31. The simulated explosive device of claim 25, wherein the at least one sensor is selected from the group selected from a proximity-activated sensor, a time delay sensor, an anti-disturbance sensor, and a magnetic sensor.

32. The simulated explosive device of claim 25, further comprising a simulated explosive filler in said body.

33. The simulated explosive device of claim 25, wherein the transmitter provides an output signal.

34. The simulated explosive device of claim 33, wherein the output signal is transmitted by at least one of the following: a RF signal, an IR signal, hard wire, fiber optic.

35. The simulated explosive device of claim 25, wherein the body resembles an explosive device.

36. The simulated explosive device of claim 25, wherein the body resembles a munition.

37. The simulated explosive device of claim 25, wherein the body resembles a bomb.

38. The simulated explosive device of claim 25, wherein the body resembles a grenade.

39. The simulated explosive device of claim 25, wherein the body resembles a landmine.

40. The simulated explosive device of claim 25, wherein the body resembles an anti-personnel mine.

41. The simulated explosive device of claim 25, wherein the body resembles a missile.

42. The simulated explosive device of claim 25, wherein the body resembles a container for an explosive device.

43. The simulated explosive device of claim 25, wherein the body resembles an Improvised Explosive Device.

44. A method for simulated device training for a trainee, comprising:
providing a simulated explosive device having at least one sensor;
providing a signal corresponding to a measurable parameter sensed by the sensor;
receiving the signal from the at least one sensor;
processing the at least one signal;
displaying sensor data to provide a display of said sensor data;
providing feedback in response to the sensor data; and
capturing a video representing of the trainee with a camera;
displaying the video representation of the trainee to provide a display of said video representation of the trainee;
wherein the display of said video representation of the trainee and the display of said sensor data are synchronized.

45. The method of claim 44, wherein the step of displaying a representation of the at least one signal comprises:
displaying the representation of the at least one signal in real time.

46. The method of claim 44, further comprising:
retrieving at least one training scenario from a storage device.

47. The method of claim 44, further comprising:
storing a training record on a storage device.

48. The method of claim 44, further comprising:
retrieving a training record on a storage device.

49. The method of claim 44, further comprising:
adjusting a threshold of the at least one sensor.

50. The method of claim 44, wherein the step of providing a simulated device having at least one sensor, the sensor providing a signal corresponding to a plurality of activity levels sensed by the sensor comprises:
providing a munition having the at least one sensor.

51. A system for simulated device training by a trainee, comprising:
- a simulated explosive device having at least one sensor that outputs a signal corresponding to a measurable parameter sensed by the sensor;
- a controller that receives the signal, the controller comprising:
  - a user interface;
  - a processor that processes the signal; and
  - a storage device;
- a display for displaying a representation of the signal;
- a feedback device interfacing with the controller; and wherein the representation of said signal is displayed in real time.

52. The system of claim 51, further comprising:
at least one camera that captures a video representation of the trainee.

53. The system of claim 52, wherein the display further displays the video representation.

54. The system of claim 51, wherein the storage device comprises at least one training scenario.

55. The system of claim 51, wherein the storage device comprises at least one training record.

56. The system of claim 51, wherein the controller further comprises:
a device for adjusting a threshold of the at least one sensor.

57. The system of claim 51, wherein the simulated device is a munition.

* * * * *